US007159828B1

(12) United States Patent
Yau et al.

(10) Patent No.: US 7,159,828 B1
(45) Date of Patent: Jan. 9, 2007

(54) DISPLAY PANEL SUPPORTING DEVICE WITH CUSHION MECHANISM

(75) Inventors: Yung-Kuo Yau, Taipei (TW); Chun-Hsiung Chen, Taipei (TW)

(73) Assignee: Compal Electronics, Inc. (TW)

( * ) Notice: Subject to any disclaimer, the term of this patent is extended or adjusted under 35 U.S.C. 154(b) by 0 days.

(21) Appl. No.: 11/205,039

(22) Filed: Aug. 17, 2005

(30) Foreign Application Priority Data

Feb. 24, 2005   (TW) .............................. 94202940 U

(51) Int. Cl.
     *A47F 5/00*         (2006.01)
(52) U.S. Cl. .............................. 248/125.8; 248/123.11; 248/161; 248/676; 248/917; 361/681
(58) Field of Classification Search ............. 248/274.1, 248/276.1, 123.11, 125, 159, 125.9, 162.1, 248/127, 917, 919, 125.8, 161, 676; 361/682, 361/681
     See application file for complete search history.

(56) References Cited

U.S. PATENT DOCUMENTS 6,189,849 B1 *  2/2001  Sweere et al. ........... 248/286.1
6,702,238 B1 *  3/2004  Wang ....................... 248/125.8
6,712,321 B1 *  3/2004  Su et al. ................. 248/123.11
6,796,537 B1 *  9/2004  Lin ........................... 248/162.1
6,874,743 B1 *  4/2005  Watanabe et al. ......... 248/276.1
6,918,564 B1 *  7/2005  Yen et al. ................... 248/404
6,997,422 B1 *  2/2006  Sweere et al. .......... 248/123.11
7,036,787 B1 *  5/2006  Lin ............................. 248/676
2006/0038092 A1 *  2/2006  Choi ........................... 248/121

* cited by examiner

*Primary Examiner*—Carl D. Friedman
*Assistant Examiner*—Tan Le
(74) *Attorney, Agent, or Firm*—Bacon & Thomas PLLC

(57) ABSTRACT

A display panel supporting device with cushion mechanism comprising a fixed supporting column, a sliding column fitted into the supporting column and arranged to move in sliding manner relative to the fixed supporting column for adjusting the height of the display panel and a cushion mechanism installed between the fixed supporting column and the sliding column and arranged to move synchronously with the sliding column, and the cushion mechanism has the effect of increasing the friction force between the supporting column and the sliding column, and the friction force can remain unchanged even after a long period of use that can improve the function of height adjusting, and prolong the service life of the display panel supporting device.

3 Claims, 3 Drawing Sheets

DISPLAY PANEL SUPPORTING DEVICE WITH CUSHION MECHANISM

BACKGROUND OF THE PRESENT INVENTION

1. Field of the Present Invention

The invention relates to a display panel supporting device, particularly the display panel supporting device with cushion mechanism.

2. Description of Prior Act

The supporting seat for traditional type CRT or LED display does not have the height adjustable function which can only be used in fixed height. Therefore, in other words, the drawback of the traditional CRT or LED display is that the height of CRT or LED screen can not be adjusted according to the user's habit or the requirement of environment.

In order to improve the drawback of the traditional CRT or LED screen of unable to adjust the height the inventor has disclosed an invention with title of "Adjustable supporting device for a display panel" which comprised a fixed supporting column and a sliding column fitted into the fixed supporting column and arranged to move in sliding manner relative to the fixed supporting column for adjusting the height of the display panel. The invention has been granted the U.S. patent right with patent No. 6,712,321.

However, since this type of supporting device for display panel as disclosed in the above-mentioned invention has no cushion mechanism installed between the fixed supporting column and the sliding column, the service life of the device is reduced due to wear and tear of the contact surface between the supporting column and the sliding column, therefore, a modification of the supporting device is proposed by the applicant by incorporating a cushion mechanism into the device so as to promote the function of application and prolong the service life of the "Supporting device for display panel".

SUMMARY OF THE PRESENT INVENTION

Based on the above, the major purpose of the present invention is to provide a display panel supporting device with cushion mechanism which comprises a fixed supporting column, a sliding column fitted into the fixed supporting column and arranged to move in sliding manner relative to the fixed supporting column for adjusting the height of the display panel and a cushion mechanism installed between the supporting column and the sliding column and arranged to move synchronously with the sliding column, particularly, the cushion mechanism installed herein has the effect of increasing the friction force between the supporting column and the sliding column, and can keep the friction force unchanged even after long period of use that can improve the function of height adjusting and prolong the service life of the supporting device for display panel.

The invention is to provide a high abrasion resistance cushion mechanism resistance for display panel which includes an abrasive-resistant liner, or further includes an cushion elastic piece, and the abrasive-resistant liner is arranged to move synchronously with the sliding column for maintaining high friction force, or by installing the cushion elastic piece between the sliding column and the abrasive-resistant strip liner, particularly, by arranging the cushion elastic piece installed between the sliding column and the abrasive-resistant strip liner on the lower part of the abrasive-resistant liner to enable the abrasive-resistant liner a tendency to press against the sliding column to increase the friction force between the supporting column and the sliding column, and improve the function of height adjusting as well as the service life of the supporting device for display panel.

BRIEF DESCRIPTION OF THE DRAWING FIGURES

DETAILED DESCRIPTION OF THE PREFERRED EMBODIMENTS

Figure 1:
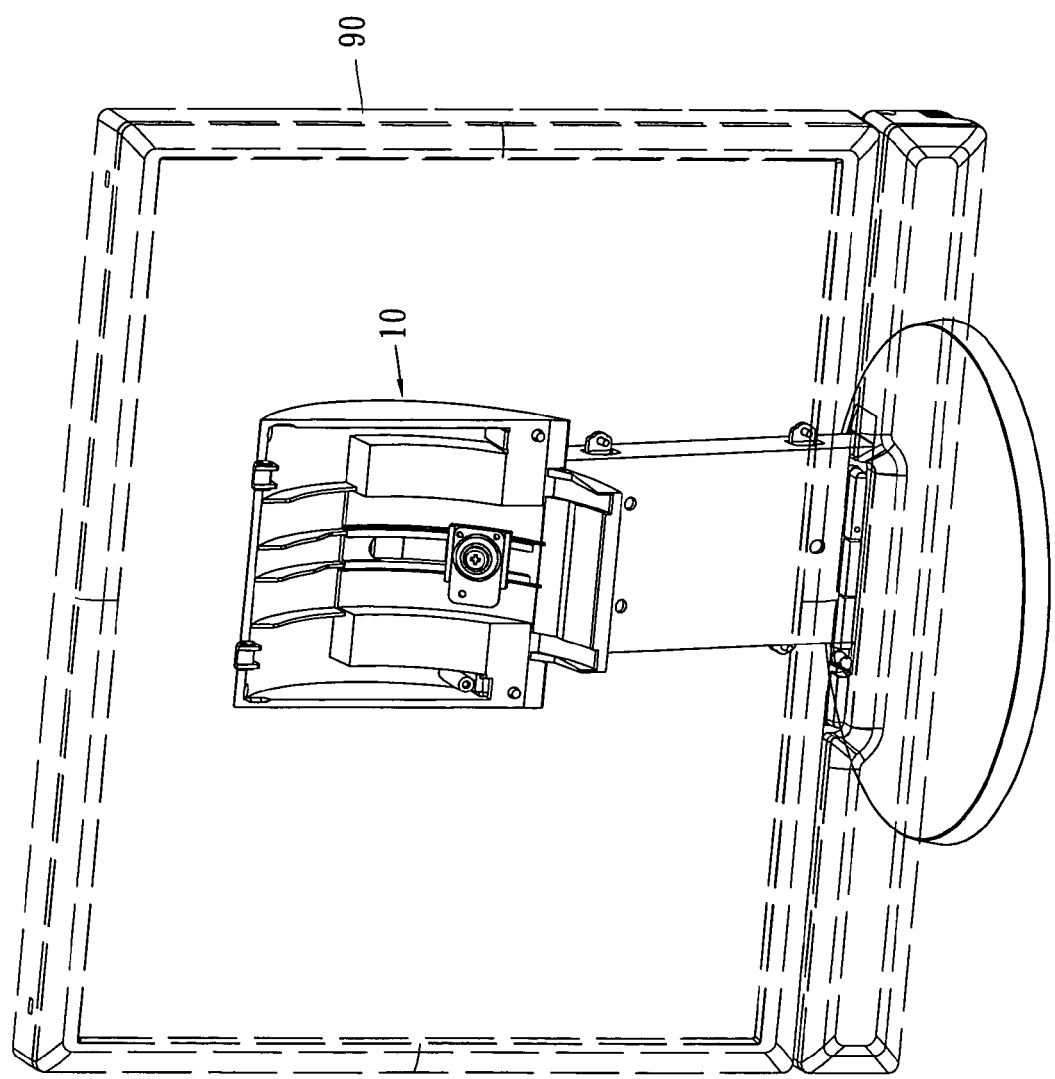
FIG. 1 is application drawing of the display panel supporting device of the invention.
Figure 2:
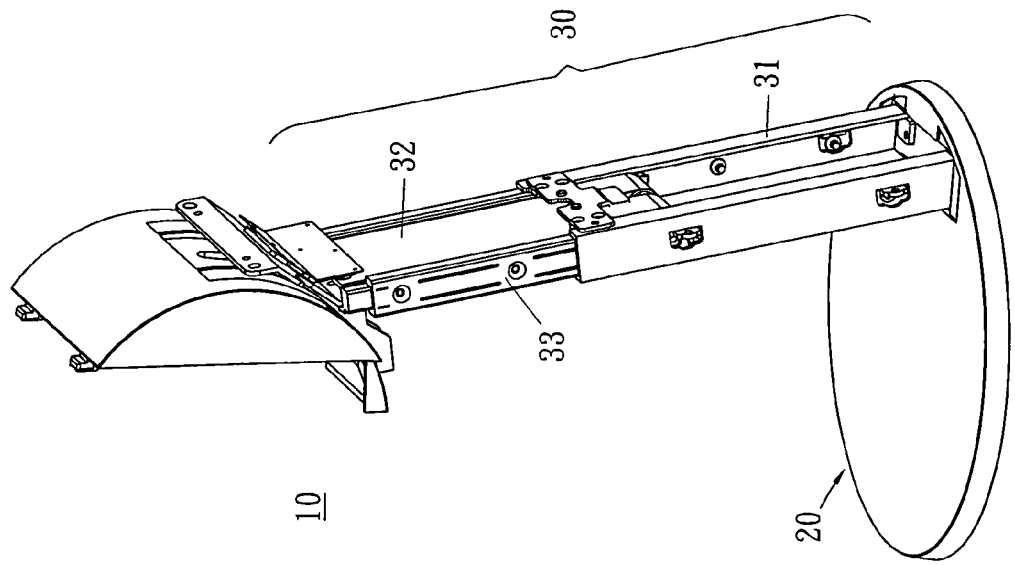
FIG. 2 is the schematic drawing of the display panel supporting device of the invention showing its height adjusting mechanism.
Figure 2:
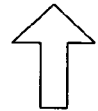
Figure 2:
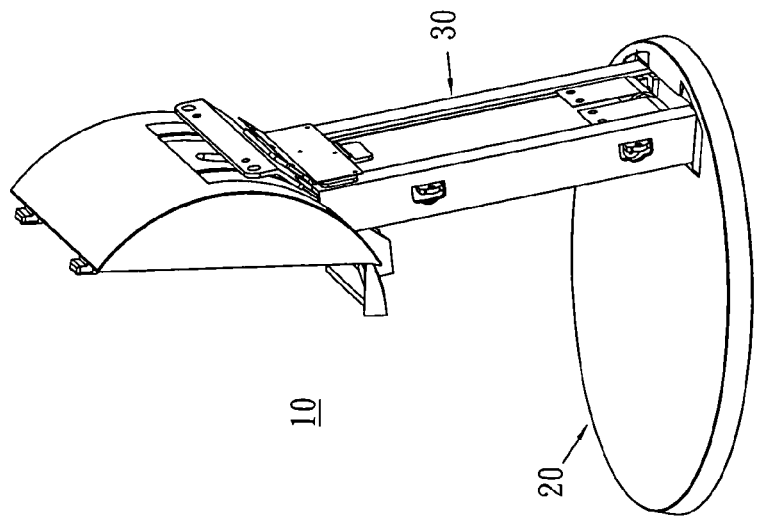

As shown in FIG. 1 and FIG. 2, the display panel supporting device 10 of the invention is designed for supporting the LCD display panel 90, and comprises a base seat 20 and a height adjusting mechanism 30 wherein the base seat 20 has the function of providing a firm support and is for mounting the height adjusting mechanism 30 so that the LCD display panel 90 can be firmly and securely put on a flat surface, and the height adjusting mechanism 30 enables the LCD display panel 90 to possess the height adjusting function as shown in FIG. 2.

Figure 4:
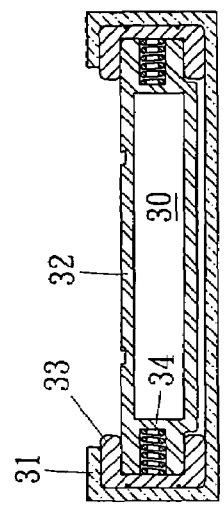
FIG. 4 is the sectional drawing of the display panel supporting device of the invention showing the position of the parts in the mechanism relative to each other and the movement relationship between the parts in the mechanism.
Figure 3:
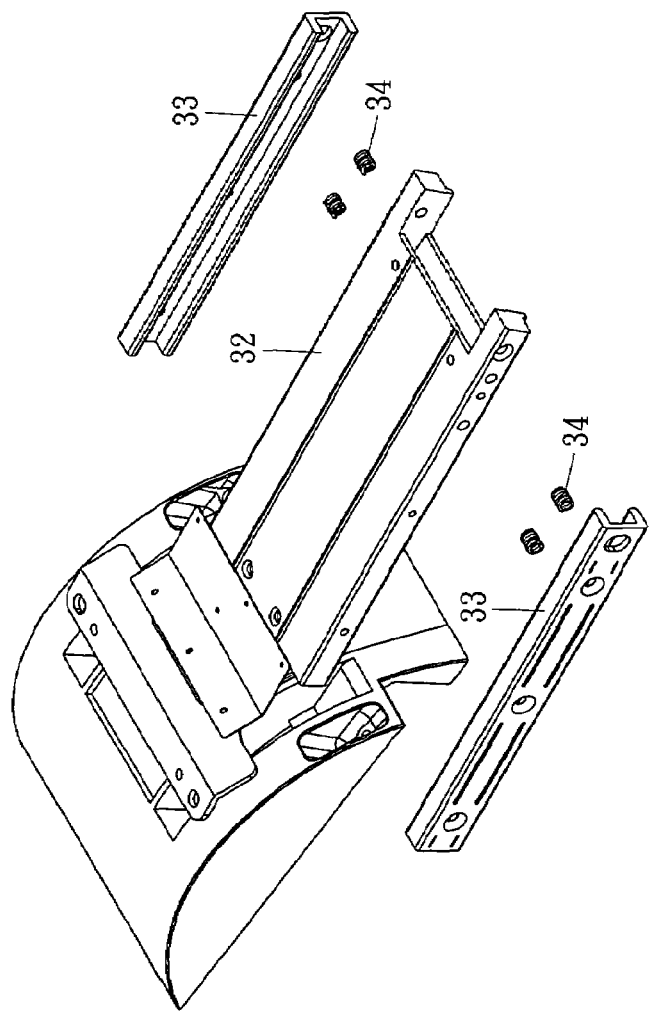
FIG. 3 is the disassembly drawing showing the parts of the display panel supporting device of the invention.

The structure of the height adjusting mechanism 30 is shown in FIG. 2 through FIG. 4 which comprises a supporting column 31, a sliding column 32 and an abrasive-resistant liner 33 wherein the supporting column 31 is fixed on the base seat 20, and the inner side of the supporting column 31 provides space for the sliding column 32 and the abrasive-resistant liner 33 to fit in jointly and to move in sliding manner inside the supporting column 31 to effect the height adjusting function; The abrasive-resistant liner 33 is made of soft and abrasive-resistant plastic material or composite material with hardness lower than metal, and is mounted on the side surface of the sliding column 32. Therefore, when tie sliding column 32 and the abrasive-resistant liner 33 are jointly fitted into the supporting column 31, the abrasive-resistant liner 33 is positioned between the supporting column 31 and the sliding column 32 which, in addition to forming the abrasive-resistant liner, can also move synchronously with the sliding column 32 to generate friction force against the supporting column 31, so that the sliding column 32 can be held on the selected position relative to the supporting column 31 by employing the friction force generated by the abrasive-resistant liner 33 against the supporting column 31.

Again, as illustrated in FIG. 3 and FIG. 4, the height adjusting mechanism 30 of the invention can further have a cushion elastic piece 34 such as a compression spring, a volute spring, or a leaf spring installed between the sliding column 32 and the abrasive-resistant liner 33, and, with this arrangement a tight contact between the abrasive-resistant liner 33 and the supporting column 31 can always be maintained by the spring force of the cushion elastic piece 34 exerted on the abrasive-resistant liner 33, and the high contact force will generate high friction force between the abrasive-resistant liner 33 and the supporting column 31.

Particularly, even a wear and tear is caused on the abrasive-resistant liner 33 due to long period use, tight contact can still be maintained by the pushing force of the cushion elastic piece 34 exerted on the abrasive-resistant liner 33. This arrangement, in addition to preventing the friction force from decreasing, can also prolong the service life of the height adjusting mechanism 30.

When the sliding column 32 and the abrasive-resistant liner 33 are jointly moved with the supporting column 31, and are stopped in the selected position, the sliding column 32 will be held in that position by the effect of the positioning mechanism (not shown in the drawing) installed between the supporting column 31 and sliding column 32, also by the effect of the static friction force caused by the contact pressure between the abrasive-resistant liner 33 and the supporting column 31 the effect of holding the sliding column in position can be strengthened.

However, when the position is to be readjusted, an appropriate external force can be easily applied to overcome the static friction force between the abrasive-resistant liner 33 and the supporting column 31 as well as the restraining force of the positioning mechanism to move the sliding column 32 together with the abrasive-resistant liner 33 to the desired position, and then the sliding column 32 is again held in the selected position by the positioning mechanism.

Since the display panel supporting device 10 has the abrasive-resistant liner 33 installed between the supporting column 31 and the sliding column 32, the friction force between the supporting column 31 and the sliding column 32 is increased and will not be decreased even after long period of use that can enhance the height adjusting function.

Although the invention has been described in its preferred form as shown in the above, it is understood that modifications, changes, improvements or alterations which have the effect equivalent to or same as the effect of the present invention, and are apparent to those skilled in the art shall be covered by the appended claims.

What is claimed is:

1. A display panel supporting device with cushion mechanism for supporting the screen of a display unit, comprising;
    a base seat having a bottom side adapted for placement on a flat surface and an upper side;
    a height adjusting mechanism, the height adjusting mechanism comprising a supporting column fixed on the upper side of the base seat and a sliding column having an abrasive-resistant liner installed on a side surface of the sliding column, the sliding column being slidably installed into the supporting column;
    wherein a cushion elastic piece is installed between the sliding column and the abrasive-resistant liner.

2. The display panel supporting device with cushion mechanism as described in claim 1, wherein the cushion elastic piece is a compression spring.

3. The display panel supporting device with cushion mechanism as described in claim 1, wherein the cushion elastic piece is a volute spring.

* * * * *